May 25, 1965  E. LONG ETAL  3,185,631
ASSEMBLY COMPRISING A HEAT SOURCE AND ASSOCIATED APPARATUS
Filed Aug. 11, 1959  5 Sheets-Sheet 1
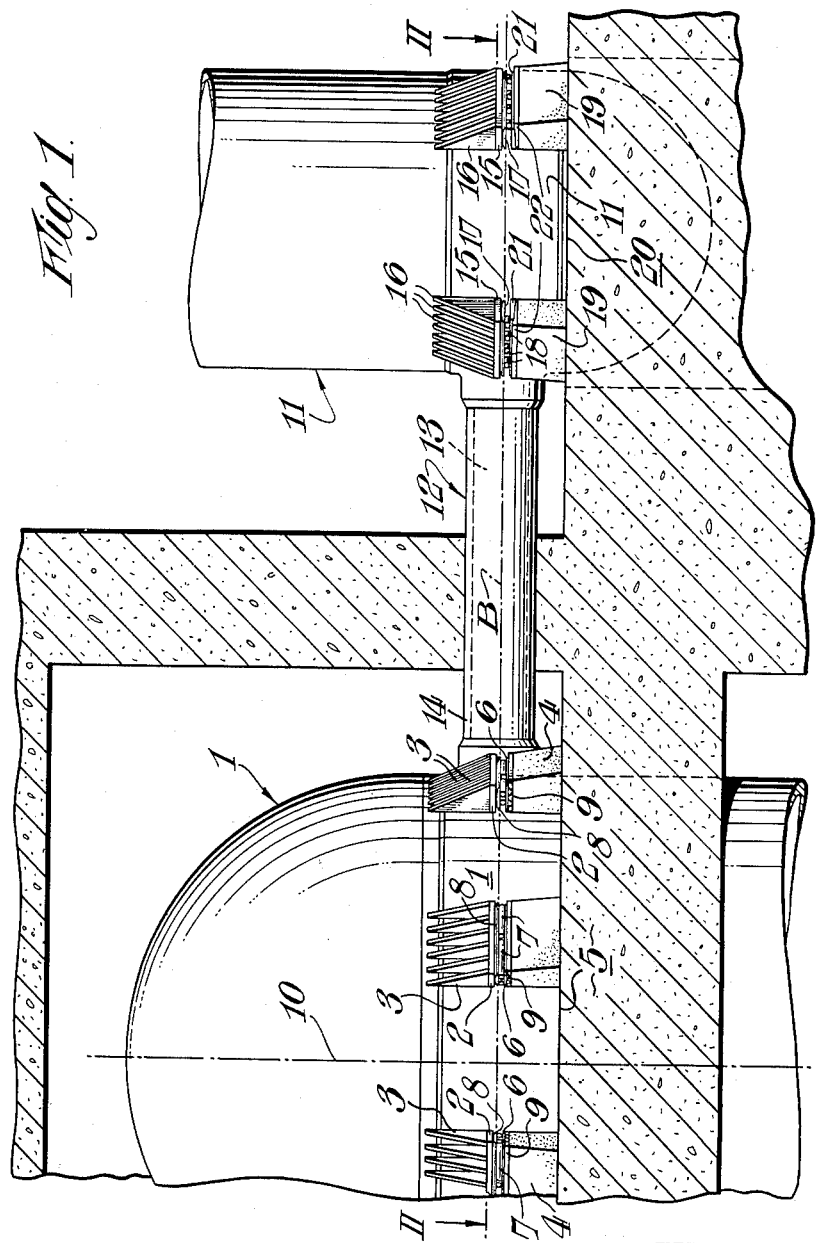
INVENTORS
EVERETT LONG
WILLIAM RODWELL
BY Larson and Taylor

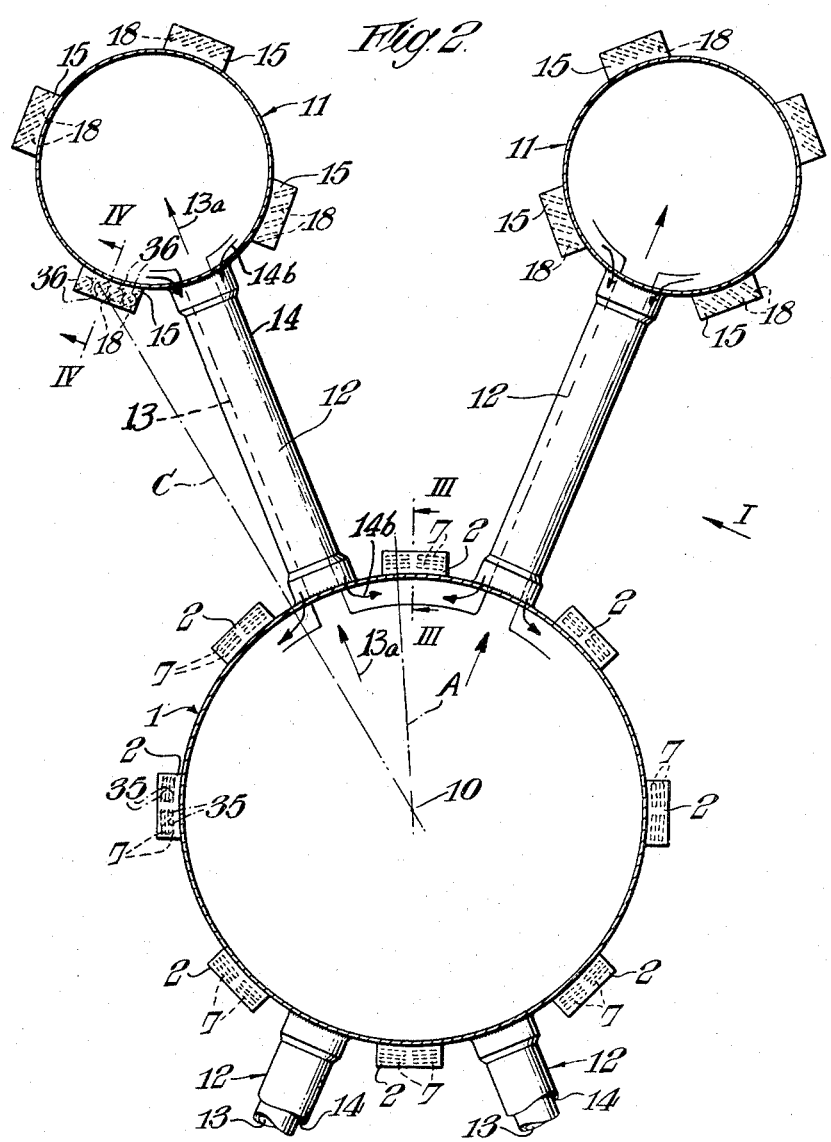

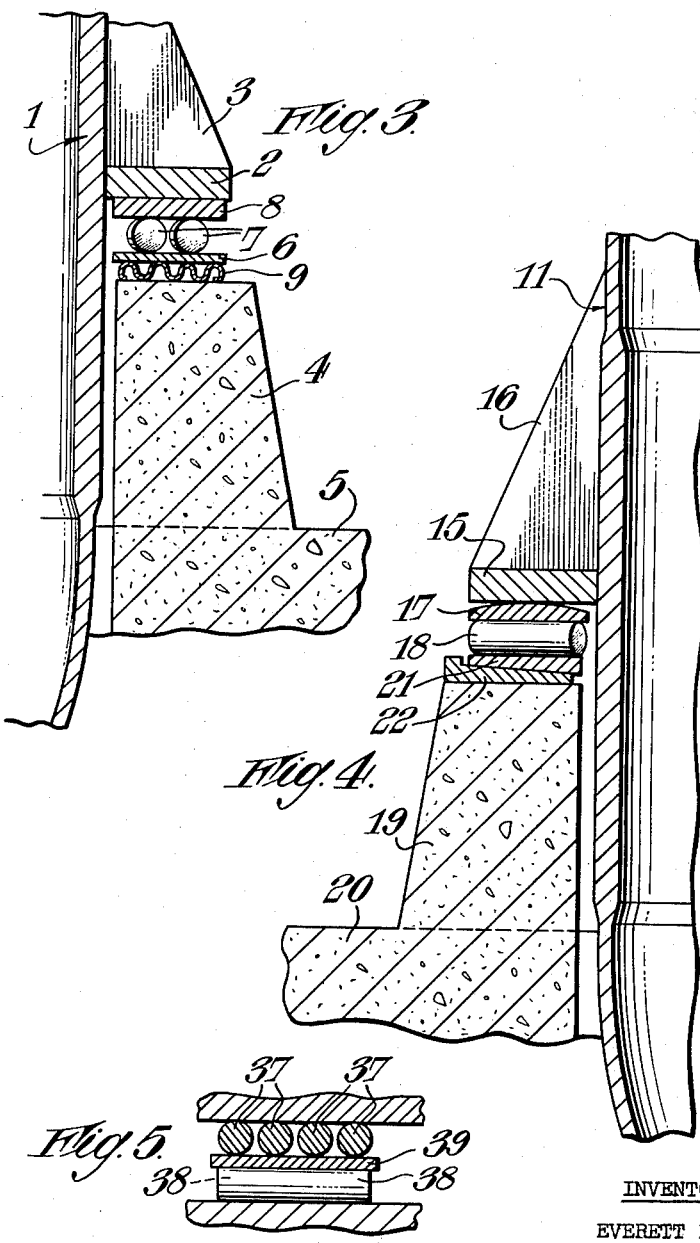

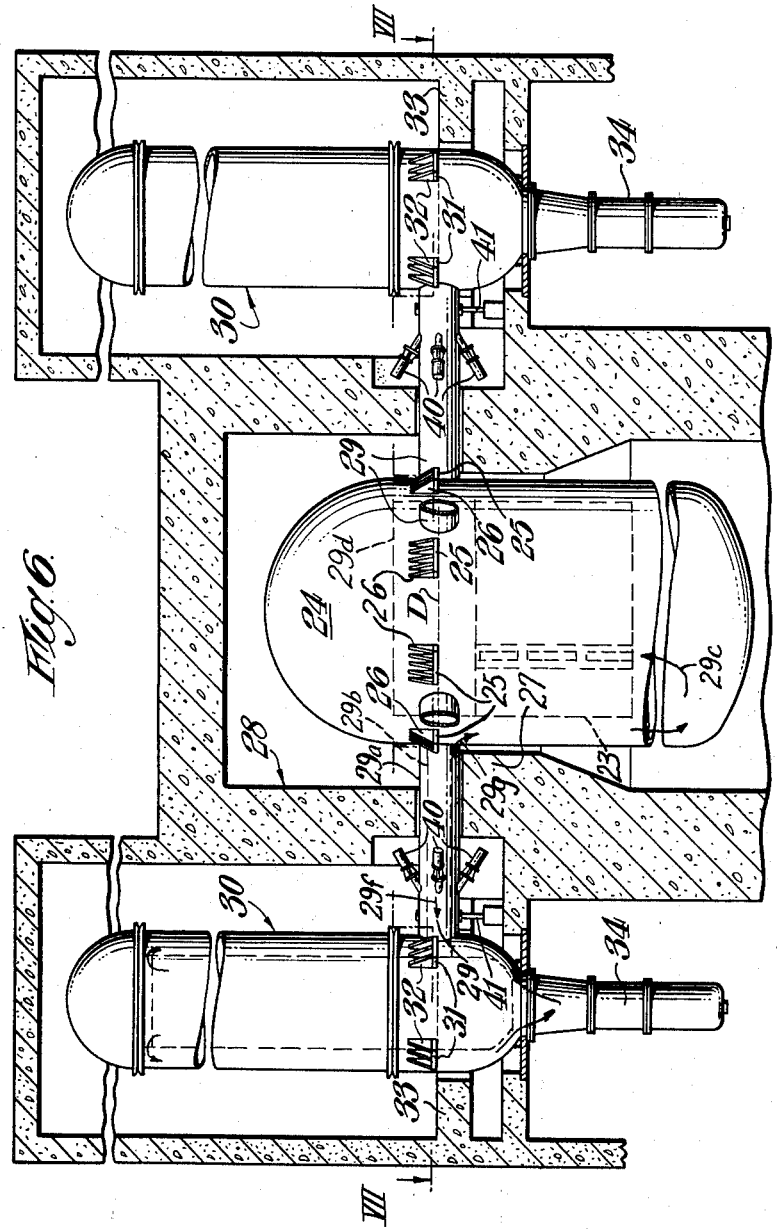

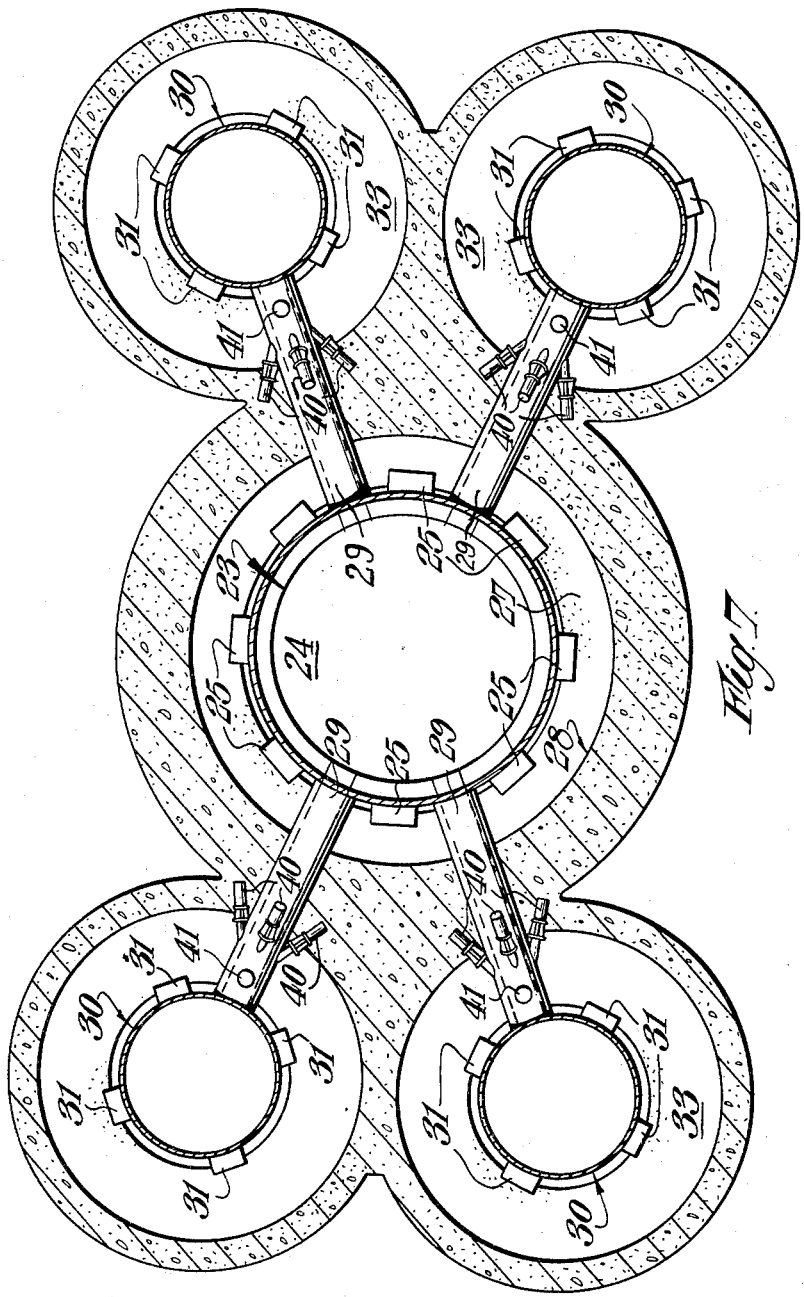

United States Patent Office 3,185,631
Patented May 25, 1965

3,185,631
ASSEMBLY COMPRISING A HEAT SOURCE AND ASSOCIATED APPARATUS
Everett Long and William Rodwell, Culcheth, near Warrington, England, assignors to United Kingdom Atomic Energy Authority, London, England
Filed Aug. 11, 1959, Ser. No. 832,960
Claims priority, application Great Britain, Aug. 11, 1958, 25,799/63
7 Claims. (Cl. 176—65)

This invention relates to that kind of assembly which comprises a massive heat source, for example, a nuclear reactor, and massive apparatus, for example one or more heat exchangers, connected thereto, wherein temperature changes occur in the heat source and give rise to problems of thermal expansion.

Previously, a nuclear reactor has been provided with a closed system coolant circuit having an inlet duct to the reactor pressure vessel, the vessel being secured to the ground, a separate outlet duct, a heat exchanger, also secured to the ground, in circuit with the inlet and outlet ducts, and means for effecting flow of coolant in the said circuit. The temperature difference between the cooler inlet duct and the hot outlet duct gave rise to thermal expansion difficulties which could only be overcome by providing expansion joints in each duct so that the unequal expansion of the ducts could be accommodated without serious stressing of the ducts, heat exchanger and pressure vessel. Another disadvantage of the use of separate ducts lies in the fact that the duct containing the hot fluid needs to be either of heat resistant material or lined internally with heat insulating material and cooled externally. The first alternative gives rise to serious difficulty in effecting a secure joint between the duct and the pressure vessel. The second alternative has an element of risk in that mechanical failure of even a small area of insulation gives rise to a local hot spot and the probability of a disastrous breach of the coolant circuit.

An attempt to overcome the problem of varying thermal expansion was the siting of the heat exchanger above the pressure vessel in a manner providing a straight upward flow of coolant fluid through the pressure vessel of the reactor to the heat exchanger, the reverse flow being downwardly within a casing enclosing both the pressure vessel and the heat exchanger. This however introduced fresh problems, amongst which were adequate shielding and the necessity for charging and control of the reactor from beneath. Furthermore, the whole assembly tended to become so tall as to necessitate a supporting structure which needed to be very massive to possess the necessary strength.

According to the invention, an assembly of the hereinbefore specified kind has means for peripherally supporting the heat source so as to allow of expansion and contraction movement, occurring on temperature change, radially relative to an immovable axis of the heat source, means for supporting said massive apparatus so that the latter is capable of moving as dictated by the expansion or contraction of the heat source, by the expansion or contraction of the means connecting the heat source to the apparatus, and by its own expansion or contraction, and the heat source and apparatus being supported in a plane which is common to both, is at right angles to the said axis and furthermore contains the axis of the connecting means, said connecting means being coaxial ducting providing two-way connection between the heat source and the said apparatus. The inner duct is preferably the outflow from the heat source.

Valve means is preferably provided for both inner and outer ducts.

Where the said apparatus is a heat exchanger and a circulator is employed for circulating heat transfer medium between the heat source and heat exchanger, the circulator is preferably disposed within the casing of the heat exchanger.

The said means for supporting the heat source preferably comprises supporting structures disposed peripherally around the heat source, projections of the heat source being mounted on rollers supported by the said structures with their axes generally at right angles to radial relative to the axis of the heat source. Instead of employing rollers, balls or differential roller assemblies may be used.

Means for supporting the said apparatus may be similar to the means for supporting the heat source, except that the axes of the rollers are all generally at right angles to a line intersecting the respective roller and passing through the axis of the heat source. Instead of employing rollers, balls or differential roller assemblies may be used.

In order that the invention may be fully understood and more readily carried into practice, we have caused to be appended hereunto drawings illustrating various constructional examples thereof, wherein:

FIGURE 1 is a fragmentary side view, regarded in the direction of arrow I of FIGURE 2, of an assembly according to the invention, FIGURE 2 is a plan view in section on a line corresponding to line II—II of FIGURE 1, FIGURE 3 is a detached side view in section of means for supporting the heat source, drawn to a larger scale than FIGURES 1 and 2, FIGURE 4 is a similar view to FIGURE 3 and illustrates an alternative construction of supporting means as applied to the apparatus connected to the heat source, FIGURE 5 is a diagrammatic side view in medial section of an alternative supporting expedient, FIGURE 6 is a side view in medial section of an assembly of particular application, and FIGURE 7 is a plan view in section on line VII—VII of FIGURE 6.

Referring to the drawings, in the construction shown in FIGURES 1–4 thereof, as applied by way of example to an assembly consisting of a massive heat source connected to one or more massive heat exchangers, we provide a generally cylindrical-walled massive heat source 1 provided with a plurality, for example, as shown in FIGURE 2, eight peripherally spaced lugs 2 having strengthening fillets or ribs 3. Pillars 4 provided on an annular supporting ledge 5 each have a member 6 (see particularly FIGURE 3) supporting rollers 7 carrying the respective lug 2 through interposition of a member 8 having an arcuate upper surface engaging the lug 2. In order to effect load-balancing, a member 9 of corrugated preferably resilient plate metal is interposed between the pillars 4 and the respective members 6. The axes of the rollers 7 are at right angles to a radial line A (see FIGURE 2) from the axis of the heat source (indicated by the dot-and-dash lines 10 in FIGURE 1 and by the point 10 in FIGURE 2) which bisects the respective roller 7.

The heat source 1 is connected to one or more heat exchangers 11 (two of which are shown in FIGURE 2 by way of example, connections for a further two heat exchangers being also shown) by coaxial ducting 12 providing an inner duct 13 conveying fluid heat transfer medium (arrow 13a) from the heat source 1 to the heat exchanger 11 or respective heat exchanger, and an outer duct 14 returning the said fluid (arrow 14b) to the heat source 1. The common axis of the ducting 12 is in the same plane (indicated by line B of FIGURE 1) as the plane of support of the heat source 1, which latter is the plane containing the lower surfaces of the members 8.

Each heat exchanger 11 is generally cylindrical-walled and has peripherally spaced lugs 15 (four of which are shown per heat exchanged by way of example in FIGURE 2) with fillets or ribs 16, similar to the lugs 2 and ribs 3 of the heat source 1, supported through the intermediary of members 17, similar to the members 8, upon rollers 18 which are themselves supported by pillars 19 carried by an annular supporting ledge 20 (which may be integral with the ledge 5) through the intermediary of load-balancing members 21 and 22 (see FIGURE 4). Alternatively, the expedient illustrated in FIGURE 3 may be employed for load-balancing of each heat exchanger 11, namely substitution of members 6 and 9 of FIGURE 3 for members 21 and 22 respectively, of FIGURE 4. The plane of support of each heat exchanger 11, namely the plane containing the lower surfaces of the members 17 (line B of FIGURE 1), contains the common axis of the ducting 11, and the axis of each roller 18 is at right angles to a radial line (for example line C of FIGURE 2), from the axis of the heat source 1 which bisects the respective roller 18. Thus the alignment of the axes of the rollers 7 is such as to allow of expansion of the heat source radially outwardly from its axis 10, and the alignment of the axes of the rollers 18 is such as to allow of the radial expansion of the heat source and the corresponding bodily movement of each heat exchanger 11 together with the radial expansion of each heat exchanger 11 itself. Contractions in reverse directions are likewise allowed for. Furthermore, by disposing the plane of support of the heat source 1, the plane of support of each heat exchanger 11, and the common axis of the ducting 12 in a common plane, unwanted stresses on expansion or contraction which, due to the massive nature of the heat source 1 and heat exchanger(s) 11 would be of great magnitude, are prevented or largely reduced.

In an alternative supporting expedient, instead of employing rollers 7 for supporting the heat source, balls may be employed. This alternative is illustrated in FIGURE 2 wherein balls are shown in dot-and-dash lines and designated 35. Balls may also be employed for supporting the or each heat exchanger 11 instead of the rollers 18, being shown by way of example in FIGURE 2 in dot-and-dash lines and designated 36. In another alternative supporting expedient, differential roller assemblies may be employed. A suitable assembly is illustrated diagrammatically in FIGURE 5 and consists of a series of rollers 37, a series of rollers 38, and a floating plate 39 separating the two series, the parallel axes of the rollers of one series being at right angles to those of the other series. Each assembly may replace the rollers 7 or balls 35 supporting the heat source 1, or the rollers 18 or balls 36 supporting each heat exchanger 11. The advantage of employing the balls or differential roller assemblies is that they allow for differential expansion or contraction as may occur, for example, if one or more of the heat exchangers 11 be isolated from the heat source 1 with the remainder in connection.

In FIGURES 6 and 7, the application of the invention to a nuclear reactor as heat source is illustrated, the construction being similar in principle to that described with reference to FIGURES 1 to 5. A nuclear reactor core structure 23 forms the heat source and is confined in a pressure vessel 24 which has lugs 25 with strengthening fillets or ribs 26 and is supported in a similar manner to that described with reference to FIGURES 1, 2 and 3 or 5 by rollers, balls or differential roller assemblies as hereinbefore described, engaging, through load-balancing devices, pillars (not shown) extending from an annular ledge 27 formed as part of the containment 28 which is usually of reinforced concrete. Co-axial ducting 29 having an outlet duct 29a and an inlet duct 29b and having poppet valves 40 for the outer ducting and butterfly valves 41 for the inner ducting connects the pressure vessel 24 with four heat exchangers 30 disposed within the containment 28 and supported by means of lugs 31 having stiffening fillets or ribs 32, rollers (or balls of differential roller assemblies), load balancing devices and pillars (not shown), the pillars being carried on an annular ledge 33 of the containment 28, in similar manner to that described for the heat exchanger(s) 11 with reference to FIGURES 1, 2 and 4 or 5. The planes of support of the pressure vessel 24 and heat exchangers 30 and the axis of the ducting 29 lie in a common plane illustrated by the line D of FIGURE 5. Gaseous coolant is circulated between reactor core 23 and heat exchangers 30 by a circulator 34 disposed within the body of each heat exchanger 30. The coolant is circulated along the outer ducts 29a into the pressure vessel 24 where it passes downwardly (arrow 29g) in contact with the cylindrical wall thereof, upwardly (arrow 29c) over fuel elements in the core of the reactor, into a hot box 29d within the pressure vessel, along the inner ducts 29b which are connected to the hot box through expansion joints (arrow 29f), upwardly through the heat removing means of the heat exchanger 30, and downwardly in contact with the cylindrical walls of the heat exchangers 30 to the respective circulators 34. The poppet valves 40 and butterfly valves 41 may be, for example, as disclosed in British Patent specification No. 886,320 and serve for isolating the heat exchangers 30 separately or collectively from the pressure vessel 24. The inner ducts are provided with internal lagging to minimise heat loss to the outer ducts.

The advantage of employing co-axial ducting resides mainly in its greater safety but also resides in its resolving of the mechanical problems presented by employing separate ducts. The hot fluid inner duct of the co-axial ducting has to support only a small pressure difference. Since the higher pressure is on the outside, failure of the heat insulation lagging and subsequent rupture would lead to an inward leak of cool gas and the integrity of the main pressure bearing membranes would not be jeopardized. As the hot fluid inner ducts are not connected to the main load bearing members but only to a hot box through expansion joints and to heat exchanger elements, then because these ducts are completely contained within pressure bearing members the same high degree of leak tightness is not essential and mechanical joints and heat resistant material can be used without undue difficulty.

Failure of part of the internal lagging on the inner ducts would be less likely to cause rupture of the hot gas ducts because the pressure difference is very much less, and also because the cooling exerted by the outer ducts is likely to be more effective, than with separate ducts.

It will also be appreciated that load bearing by the reactor pressure vessel is improved by the means of support thereof. Where a reactor pressure vessel is supported at or near its base by a skirt, stressing of the vessel due to the weight of its shell and the weight of components connected thereto above the skirt support, such as ducting, access standpipes, etc., is manifest as a compressive loading tending to radial distortion of the vessel. By supporting the pressure vessel near its top and in a plane containing the common axis of the co-axial ducting, the vessel in the region of the supports is subjected to a tensile loading due to the weight of the part of the vessel below the supports. This loading is increased by the weight of components within the pressure vessel, such as the moderator, reflector, fuel elements, and an internal neutron shield (see for example our copending U.S. application Serial No. 798,519) which can either be suspended in a cradle from that part of the vessel which carries the supports or can be mounted on a grid structure carried by brackets on the interior bottom part of the vessel. However, the vessel can be constructed to accept such tensile loading, for example by increasing plate thickness in the region of the supports where suspension of the internal load is employed, and the greater part of the vessel is then not subject to radial distortion. The vessel in the region of the supports is then only subjected to a compressive loading due to the weight of the top dome of the vessel and the weight of access standpipes passing therethrough, and as this loading will be small compared with the tensile loading, it can easily be designed for, as by increasing the thickness of the vessel in the said region, so that no radial distortion of the pressure vessel occurs.

We claim:

1. In a nuclear reactor having a reactor core, a pressure vessel containing the core, a coolant circulator to circulate coolant through the vessel to extract heat from the core, a heat exchanger to which the coolant yields its heat, coaxial ducting extending between the pressure vessel and the heat exchanger for the transfer of coolant between them, and bearings for the pressure vessel and heat exchanger supporting the pressure vessel and heat exchanger for movement radially with respect to each other, said bearings lying in the same plane as the axis of the coaxial ducting.

2. In a nuclear reactor having a reactor core, a pressure vessel containing the core, a coolant circulator to circulate coolant through the vessel to extract heat from the core, heat exchangers to which the coolant yields its heat, coaxial ducts extending radially of the pressure vessel for the transfer of coolant to heat exchangers disposed around the pressure vessel, and bearings for the pressure vessel and heat exchangers supporting the pressure vessel and heat exchanger for movement radially with respect to each other, said bearings lying in the same plane as the axis of the coaxial ducts.

3. In a nuclear reactor having a reactor core, a pressure vessel containing the core, a coolant circulator to circulate coolant through the vessel to extract heat from the core, heat exchangers to which the coolant yields its heat, straight coaxial ducts extending between the pressure vessel and the heat exchangers in a direction radial to both the pressure vessel and their respective heat exchangers for the transfer of coolant between them, and bearings for the pressure vessel and heat exchangers supporting the pressure vessel and heat exchanger for movement radially with respect to each other, said bearings lying in the same plane as the axes of the coaxial ducts.

4. In a nuclear reactor having a reactor core, a pressure vessel containing the core, a coolant circulator to circulate coolant through the vessel to extract heat from the core, heat exchangers to which the coolant yields its heat, coaxial ducts extending radially of the pressure vessel for the transfer of coolant to heat exchangers disposed around the pressure vessel, roller bearings for the pressure vessel which lie in the same plane as the coaxial ducts and have their axes so aligned that they permit radial thermal expansion and contraction of the pressure vessel while restricting lateral movements of the pressure vessel, and roller bearings for the heat exchangers which lie in the same plane as the coaxial ducts and have their axes so aligned that they permit thermal movement of the heat exchangers in a direction radial to the pressure vessel while restricting lateral movement of the heat exchangers.

5. In a nuclear reactor having a reactor core, a pressure vessel containing the core and a heat exchanger to extract heat from coolant circulated through the pressure vessel, the provision of coaxial ducting extending between the pressure vessel and the heat exchanger for the transfer of coolant between them, bearings for the pressure vessel and heat exchanger which lie in the same plane as the axis of the coaxial ducting, and a coolant circulator disposed within and supported by the heat exchanger, with the result that the circulator moves with the heat exchanger during thermal expansion and contraction of the pressure vessel, heat exchanger and coaxial ducting.

6. A pressurized fluid-cooled nuclear reactor system comprising a reactor pressure vessel, a reactor core in said pressure vessel, a heat exchanger, straight horizontal coaxial ducts between said reactor pressure vessel and heat exchanger, rolling support means for the pressure vessel disposed to allow radial expansion of the pressure vessel in the horizontal plane of said ducts, rolling support means for the heat exchanger also in said horizontal plane disposed to allow movement of the heat exchanger colinearly with said ducts and reactor coolant circulating means appended to said heat exchanger.

7. A pressurized fluid-cooled nuclear reactor system comprising a reactor pressure vessel, a reactor core in said pressure vessel, means defining coolant flow from an upper level in said vessel over the wall of said vessel and thence upwards through channels in said core, a coolant collecting box above said core having connections with said channels, a duct from said collecting box, straight horizontal coaxial ducts penetrating the pressure vessel at said upper level the inner one connecting with the duct from the collecting box and the outer one opening into the pressure vessel, rolling supports for said pressure vessel at said upper level, a heat exchanger, the inner coaxial duct feeding coolant to the heat exchanger surface of the heat exchanger and the outer coaxial duct opening into the heat exchanger envelope, rolling supports for said heat exchanger at said upper level and a coolant circulator appended to said heat exchanger.

References Cited by the Examiner

UNITED STATES PATENTS 2,115,714 5/38 Handy et al.
2,712,426 7/55 Banks _____ 263—46 X
2,810,689 10/57 Wigner et al. _____ 176—62
2,838,451 6/58 Long et al. _____ 176—41
2,863,815 12/58 Moore et al. _____ 176—29

FOREIGN PATENTS 785,528 10/57 Great Britain.
789,022 6/58 Great Britain.

OTHER REFERENCES

Second United Nations International Conference on the Peaceful Uses of Atomic Energy, 9/1958, p. 430 of vol. 8.

Nuclear Engineering Handbook, Etherington, 1958, pp. 13–32, McGraw-Hill.

CARL D. QUARFORTH, *Primary Examiner.*

LEON D. ROSDOL, ROGER L. CAMPBELL, REUBEN EPSTEIN, *Examiners.*